United States Patent
Tokuda et al.

(10) Patent No.: US 7,152,629 B2
(45) Date of Patent: Dec. 26, 2006

(54) FLUID CONTROL DEVICE

(75) Inventors: Ichiro Tokuda, Osaka (JP); Kenji Tsubota, Osaka (JP); Michio Yamaji, Osaka (JP); Tsutomu Shinohara, Osaka (JP)

(73) Assignee: Fujikin Incorporated, Osaka (JP)

( * ) Notice: Subject to any disclaimer, the term of this patent is extended or adjusted under 35 U.S.C. 154(b) by 21 days.

(21) Appl. No.: 10/537,093

(22) PCT Filed: Oct. 31, 2003

(86) PCT No.: PCT/JP03/13976

§ 371 (c)(1),
(2), (4) Date: Jun. 2, 2005

(87) PCT Pub. No.: WO2004/051124

PCT Pub. Date: Jun. 17, 2004

(65) Prior Publication Data

US 2006/0048830 A1    Mar. 9, 2006

(30) Foreign Application Priority Data

Dec. 3, 2002   (JP) ............................. 2002-351025

(51) Int. Cl.
*F16K 11/10* (2006.01)
(52) U.S. Cl. .................................................. 137/884
(58) Field of Classification Search ................ 137/269, 137/270, 271, 597, 884
See application file for complete search history.

(56) References Cited

U.S. PATENT DOCUMENTS 5,819,782 A * 10/1998 Itafuji ......................... 137/240
5,988,217 A * 11/1999 Ohmi et al. ............. 137/614.2

(Continued)

FOREIGN PATENT DOCUMENTS

JP    2000-18409    1/2000

(Continued)

OTHER PUBLICATIONS

International Search Report dated Feb. 17, 2004 (1 page).

*Primary Examiner*—John Fox
(74) *Attorney, Agent, or Firm*—Armstrong, Kratz, Quintos, Hanson & Brooks, LLP (57) ABSTRACT

Line interconnecting means 50 comprises lower channel blocks 51 each having a line interconnecting channel 54 and arranged in an upper stage of lines B1, B2, B3 to be interconnected, at the same position with respect to the direction of the lines, and a plurality of upper channel blocks 57 each arranged on an upper side of the lower channel blocks 51 of adjacent lines interconnected and each having a transverse channel 58a extending orthogonal to the lines and downward channel 58b extending from the transverse channel 58a and communicating with the respective line interconnecting channels 54 of the lower channel blocks 51. Each of the lower channel blocks 51 is removably fastened to a coupling member in a lower stage with screws from above, and the upper channel blocks 57 are removably fastened to the lower channel blocks 51 with screws from above.

1 Claim, 13 Drawing Sheets

U.S. PATENT DOCUMENTS

| | | | |
|---|---|---|---|
| 6,068,016 A * | 5/2000 | Manofsky et al. | 137/269 |
| 6,116,282 A | 9/2000 | Yamaji et al. | 137/884 |
| 6,116,283 A * | 9/2000 | Yamaji et al. | 137/884 |
| 6,152,175 A * | 11/2000 | Itoh et al. | 137/602 |
| 6,273,139 B1 * | 8/2001 | Ohmi et al. | 137/884 |
| 6,615,871 B1 * | 9/2003 | Ohmi et al. | 137/884 |
| 6,868,867 B1 * | 3/2005 | Yamaji et al. | 137/884 |
| 6,874,538 B1 * | 4/2005 | Bennett | 137/884 |
| 6,953,048 B1 * | 10/2005 | Chuh | 137/269 |
| 7,004,199 B1 * | 2/2006 | Funes et al. | 137/884 |
| 2002/0033195 A1 | 3/2002 | Fujimoto et al. | 137/884 |

FOREIGN PATENT DOCUMENTS

| | | |
|---|---|---|
| JP | 2002-89798 | 3/2002 |
| JP | 2002-539397 | 11/2002 |
| WO | WO 00/55529 | 9/2000 |

* cited by examiner

FLUID CONTROL DEVICE

TECHNICAL FIELD

The present invention relates to fluid control devices for use in semiconductor manufacturing apparatus, and more particularly to integrated fluid control devices which are so assembled that fluid controllers are individually removable upward for maintenance and inspection.

Figure 1:
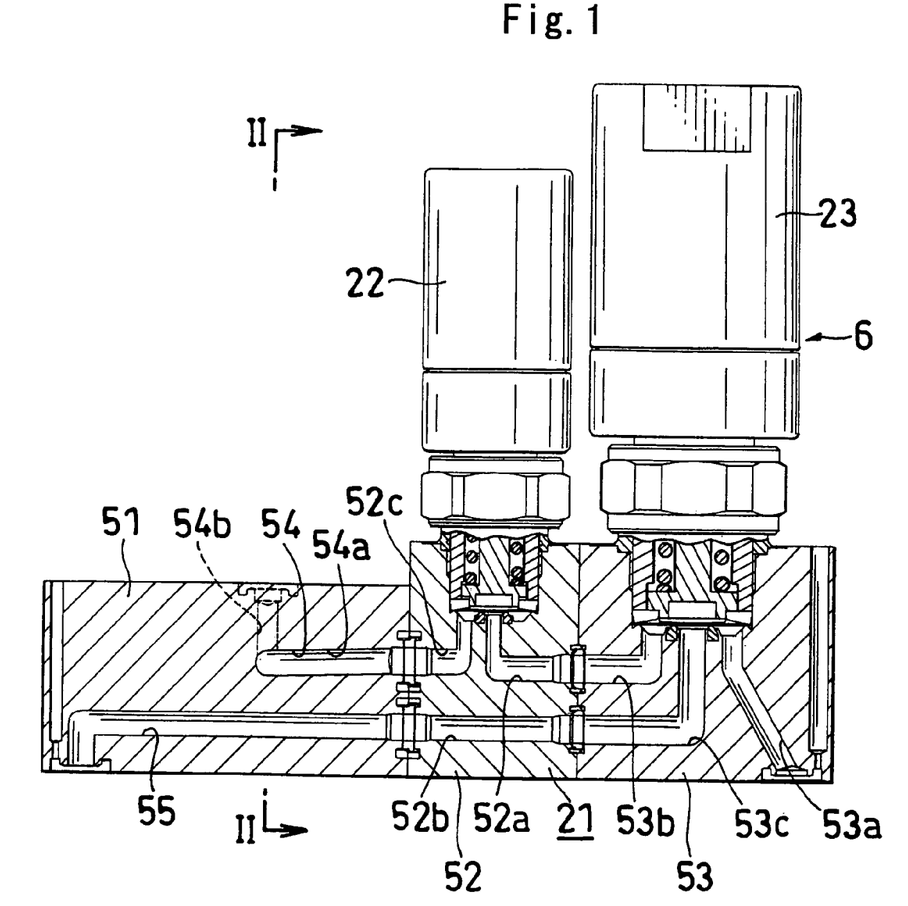
FIG. 1 is a view in vertical section showing part of line interconnecting means for use in a first embodiment of fluid control device of the invention.

With respect to the terms "front," "rear," "upper" and "lower" as used herein, the right-hand side of FIG. 1 will be referred to as "front," the left-hand side thereof as "rear," the upper and lower sides of the same drawing as "upper" and "lower," and the terms "left" and "right" are used for the device as it is seen from behind toward the front. These terms "front," "rear," "upper" and "lower" are used for the sake of convenience; the device may be used with the front-to-rear direction reversed or with their upper and lower sides positioned as the left and right sides.

BACKGROUND ART

Fluid control devices for use in semiconductor manufacturing apparatus comprise various fluid controllers arranged in rows. The channels of fluid controllers in adjacent rows are interconnected by connecting means at specified locations. With such fluid control devices, massflow controllers and shut-off valves are connected and integrated into a device without using tubes in recent years. For example, the publication of JP-A No. 2002-89798 discloses a fluid control device comprising a plurality of lines arranged in parallel on a base plate and having respective inlets, as well as respective outlets, facing toward the same direction, each of the lines comprising a plurality of fluid controllers arranged in an upper stage and a plurality of coupling members arranged in a lower stage, the specified lines among these lines having fluid channels thereof interconnected by line interconnecting means.

Figure 13:
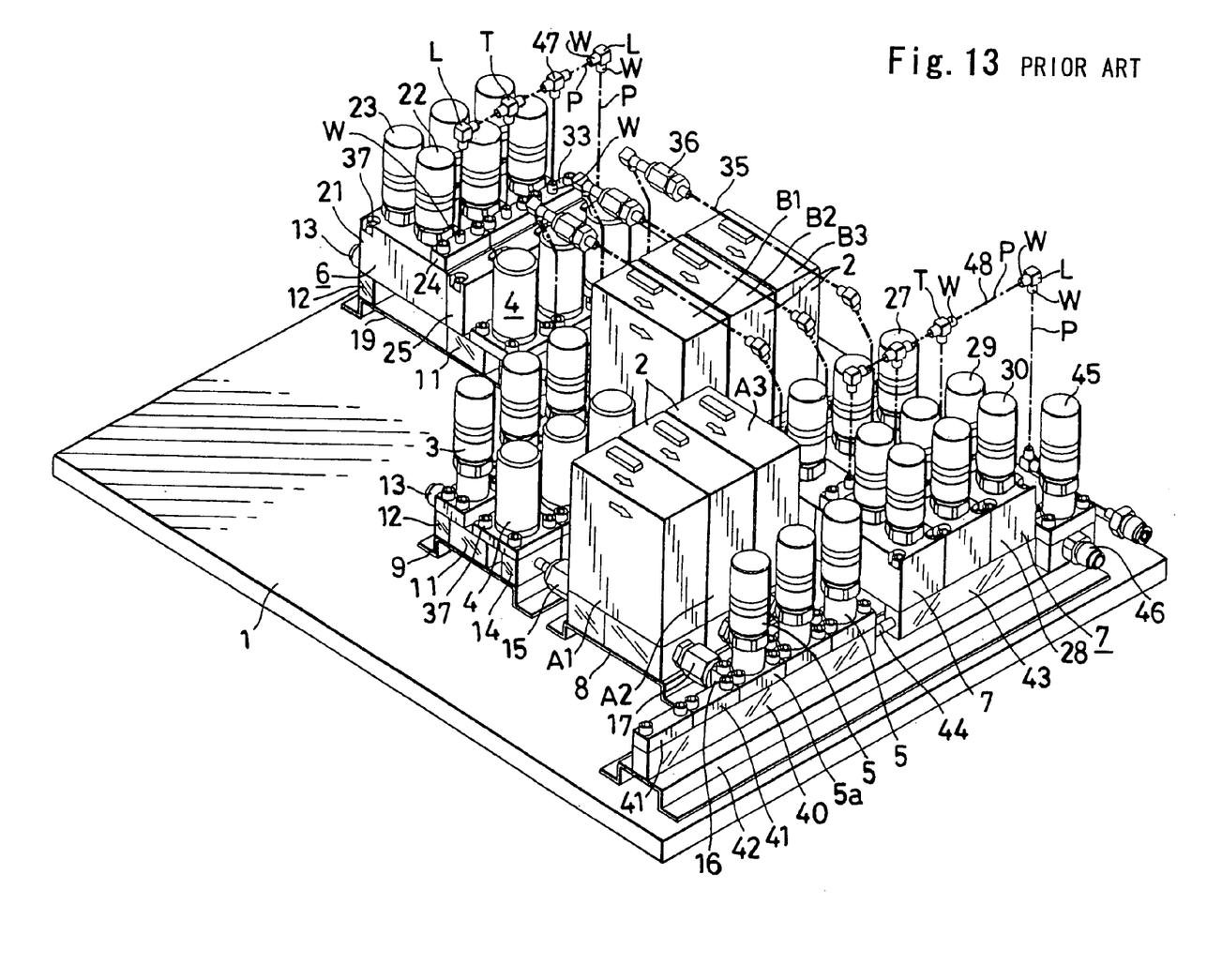
FIG. 13 is a perspective view showing a conventional fluid control device.

FIG. 13 is a perspective view showing an example of fluid control device disclosed in the publication of JP-A No. 2002-89798. The device comprises, as arranged in parallel on a base plate 1, three bypassless lines A1, A2, A3, and three lines B1, B2, B3 having bypass channels. The bypassless lines A1, A2, A3, and the bypass-having lines B1, B2, B3 comprise a massflow controller, shut-off valve, shutoff-opening device and like fluid controllers 2, 3, 4, 5, 6, 7 arranged in an upper stage, and coupling members 11, 12, 13, 14, 15, 16, 17, 40 arranged in a lower stage for interconnecting the fluid controllers 2, 3, 4, 5, 6, 7, 41.

The fluid controllers of each of the bypassless lines A1 to A3 are a massflow controller 2, an inlet-side shut-off valve 3 disposed at the inlet side of the massflow controller 2 with a filter 4 interposed therebetween and an outlet-side shut-off valve 5 provided at the outlet side of the massflow controller 2. The fluid controllers of each of the bypass-having lines B1 to B3 are a massflow controller 2, an inlet-side shutoff-opening device 6 disposed at the inlet side of the massflow controller 2 with a filter 4 interposed therebetween and an outlet-side shutoff-opening device 7 disposed at the outlet side of the massflow controller 2.

The inlet-side shutoff-opening device 6 comprises a blocklike body 21, two shut-off valve actuators 22, 23 mounted on the body 21, a blocklike coupling 24 having a tubular connector and mounted on the upper side of the body 21 and a channel block 25 attached to a side portion of the body 21. The outlet-side shutoff-opening device 7 comprises a first blocklike body (not shown) disposed close to a massflow controller 2, a first shut-off valve actuator 27 mounted on the body, a second blocklike body 28 disposed on the rear side of the first blocklike body 26 adjacent thereto, two shut-off valve actuators 29, 30 mounted on the body 28, a blocklike coupling 31 having a tubular connector and mounted on the upper side of the first body 26, a channel block 32 attached to the front side of the same and a blocklike coupling 33 having a tubular connector and mounted on the upper side of the second body 28.

A T-shaped tubular coupling (not shown) for branching off a bypass channel is disposed between a blocklike coupling 14 under the filter 4 and a tubular coupling 15 for connecting the massflow controller. An inverted U-shaped bypass pipe 35 extending above the massflow controller 2 has one end joined to this T-shaped coupling 34 and the other end joined to a blockline coupling (not shown) having a tubular connector and provided for the outlet-side shutoff-opening device 7. Provided at an intermediate portion of the bypass pipe 35 is a tubular coupling 36 for dividing the pipe 35 into an inverted L-shaped portion and an I-shaped portion.

The massflow controller 2 and the couplings 11, 12, 14 are fixed to the base plate 1 with inverted U-shaped brackets 8, 9, 19. The massflow controller 2 is singly removable upward by removing the couplings 15, 17 from opposite sides thereof, and the filter 4 and the shut-off valves 3, 5 are individually similarly removable by removing screws 37 which are driven in from above.

Indicated at 40 is a single manifold block coupling for interconnecting the three bypassless lines A1 to A3. Indicated at 43 is a single manifold block coupling for interconnecting the three bypass-having lines B1 to B3. Indicated at 41 are channel closing blocks fastened to the manifold block coupling 40 with screws 37. Indicated at 42 is an inverted U-shaped bracket for attaching the manifold couplings 40, 43 to the base plate 1. The manifold block coupling 40 for the bypassless lines is connected to the manifold block coupling 43 for the bypass-having lines by a communication pipe 44, and a common outlet for these lines is provided at the terminal end of the manifold block coupling 43 for the bypass-having lines. A shut-off valve 45 having a tubular coupling 46 is provided at this location.

To interconnect the bypass-having lines B1, B2, B3, the blocklike couplings 24 each having a tubular connector and included in the inlet-side shutoff-opening device 6 are interconnected by an inverted U-shaped communication pipe 47 serving as line interconnecting means, and the second blocklike couplings 33 each having a tubular connector and included in the outlet-side shutoff-opening device 7 are interconnected by an inverted U-shaped communication pipe 48 serving as line interconnecting means. These line interconnecting means comprise L-shaped couplings L and T-shaped couplings T, and these couplings L, T and pipe members P are joined by welding (indicated at W in the drawing).

With the conventional fluid control device described above, each line has blocklike couplings arranged in the lower stage and removably fastened to the base plate, and fluid controllers arranged in the upper stage and removably mounted on the couplings in the lower stage, whereby each controller of each line is made easy to remove and mount in place. However, since the line interconnecting means comprises couplings which are interconnected by pipe members and welding, the device has the problem that the addition and modification of lines require much time and labor for disconnecting and interconnecting the lines.

An object of the present invention is to provide an integrated fluid control device wherein the means for interconnecting the channels of lines has no welded portions so that lines can be added or modified with great ease.

DISCLOSURE OF THE INVENTION

The present provides a fluid control device comprising a plurality of lines arranged in parallel and having respective inlets, as well as respective outlets, facing toward the same direction, each of the lines comprising a plurality of fluid controllers arranged in an upper stage and a plurality of coupling members arranged in a lower stage, specified lines among said lines having fluid channels thereof interconnected by line interconnecting means, the fluid control device being characterized in that the line interconnecting means comprises lower channel blocks each having a line interconnecting channel and arranged in upper stage of the specified lines interconnected, at the same position with respect to the direction of the lines, the line interconnecting channel having at least one upward opening, and at least one upper channel block disposed on an upper side of the lower channel blocks of adjacent lines interconnected and having a transverse channel extending orthogonal to the lines and downward channels extending from the transverse channel and communicating with the upward openings of the respective line interconnecting channels of the lower channel blocks, each of the lower channel blocks being removably fastened to the coupling member in the lower stage with screws from above, the upper channel block being removably fastened to the lower channel blocks with screws from above.

The coupling members for placing fluid controllers thereon are each in the form of a rectangular parallelepipedal block, and the fluid controller has a lower portion (the portion to be placed on the coupling member) which is also a rectangular parallelepipedal block. The lower channel block and the upper channel block are also rectangular parallelepipedal. The lower channel block has in the direction of the line thereof a width equal to the width of the fluid controller and the coupling member constituting the line, and is disposed in the upper stage which is at the same level as the fluid controller. The upper channel block has in a direction orthogonal to the line a length approximately equal to the width of the line. The number of upper channel blocks to be provided is smaller than the number of lines to be interconnected by one, and each upper channel block is mounted on the lower channel blocks of adjacent two lines to be interconnected. The upper channel block may have a length orthogonal to the line and extending over all lines to be interconnected, and only one block may be mounted across all the lines. Intermediate blocks for adjusting the height of the upper channel blocks may be interposed between the upper channel block and the lower channel blocks. Alternatively, an intermediate block may be disposed at a position adjacent to the lower channel block with respect to the direction of the line for adjusting the position of the upper channel block. The latter intermediate block can be replaced by a check valve.

With the fluid control device of the present invention, the line interconnecting means comprises a lower and an upper channel block, and the lower channel block and the upper channel block are removable, so that the line interconnecting means can be provided without welding. In the case where lines are to be installed additionally, blocks are removed as required from among the channel blocks constituting the line interconnecting means, and the lines to be added are thereafter installed on the base plate. When the line interconnecting means are altered in specifications due to the additional installation, the channel blocks used before the addition and the channel blocks prepared anew are used for providing the line interconnecting means according to the altered specifications, and this prepared means is installed in place. The lines can be modified similarly. Thus, lines can be added and modified easily.

BEST MODE OF CARRYING OUT THE INVENTION

Embodiments of the present invention will be described below with reference to the drawings. The fluid control devices to be described below have basically the same construction as the one shown in FIG. 13 except for the line interconnecting means. Throughout the drawings, like components are designated by like reference numerals.

FIGS. 1 to 5 show the main portions of a first embodiment of fluid control device according to the present invention.

FIG. 1 shows inlet-side shutoff-opening devices 6 each comprising a blocklike body 21 and two shut-off valve actuators 22, 23 mounted on the body 21. A lower channel block 51 for interconnecting lines is disposed on the rear side of the body 21 of the shutoff-opening device 6. An intermediate block 56 shown in FIGS. 3 and 4 and serving, for example, as a check valve (not shown in detail) can be removably provided between the body 21 of the shutoff-opening device 6 and the lower channel block 51.

The front shut-off valve actuator 23 of the on-off valve 6 is a 3-port valve, and the rear shut-off valve actuator 22 is a 2-port valve. The device body 21 comprises two blocks 52, 53 for the 2-port valve and the 3-port valve, respectively. Formed in the block 53 for the 3-port valve are an inlet channel 53a extending from a front port and having a downward opening, a first outlet channel 53b extending from a rear port and having a rearward opening, and a second outlet channel 53c extending from a center port and having a rearward opening. Formed in the block 52 for the 2-port valve are an inlet channel 52a for causing the first outlet channel 53b of the block 53 to communicate with the front port of the 2-port valve therethrough, a bypass channel 52b communicating with the second outlet channel 53c of the block 53 and extending through the block 52 from the front rearward, and an outlet channel 52c extending from a rear port of the block 52 and having a rearward opening.

Figure 2:
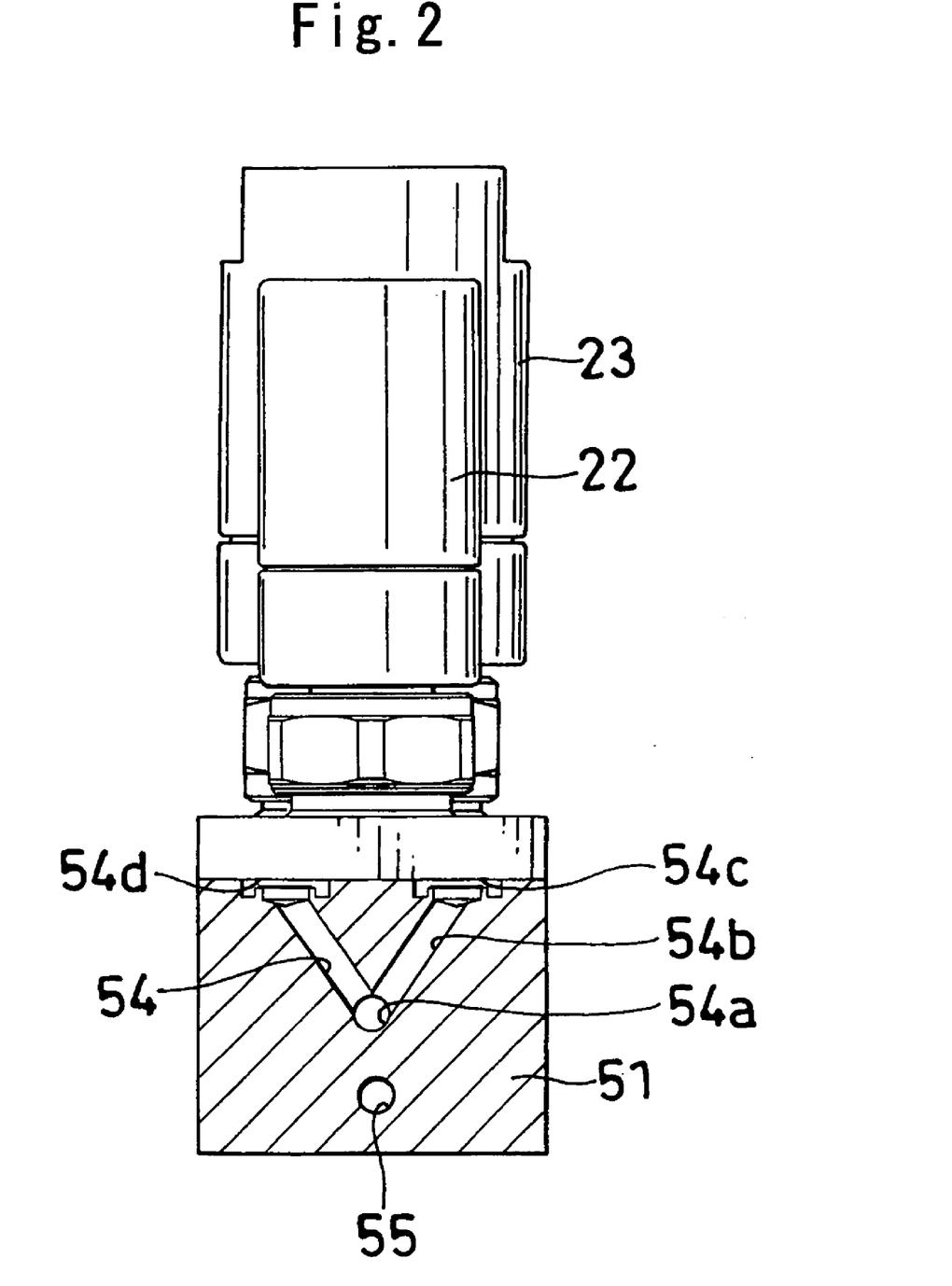
FIG. 2 is a view in section taken along the line II—II in FIG. 1.

The lower channel block 51 for line interconnection has a line interconnecting channel 54 communicating with the outlet channel 52c of the 2-port valve block 52 of the inlet-side shutoff-opening device 6 and having an upward opening, and an in-line connecting channel 55 communicating with the bypass channel 52b of the block 52 of the device 6 and having a downward opening. The line interconnecting channel 54 comprises a line-direction channel 54a extending rearward from the opening of the outlet channel 52c of the device 6, and an upward channel 54b extending upward from the rear end of the channel 54a and having an upward opening. As shown in FIG. 2, the upward channel 54b comprises two branch channels arranged in a V shape and extending obliquely upwardly leftward and rightward, respectively, when seen from behind and has right and left upward openings 54c, 54d spaced apart by a predetermined distance orthogonal to the line.

Figure 3:
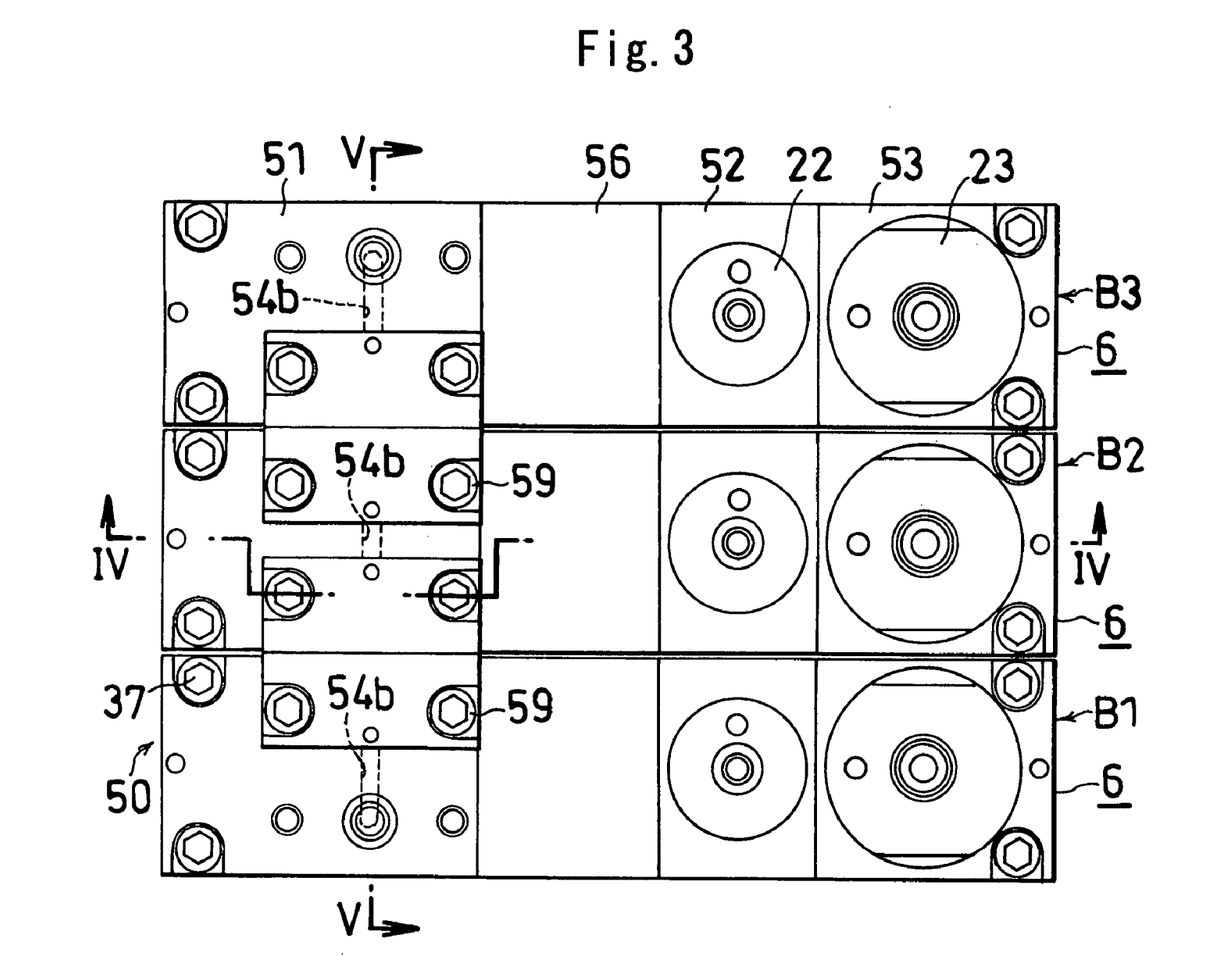
FIG. 3 is a fragmentary plan view showing the first embodiment of fluid control device of the invention.
Figure 4:
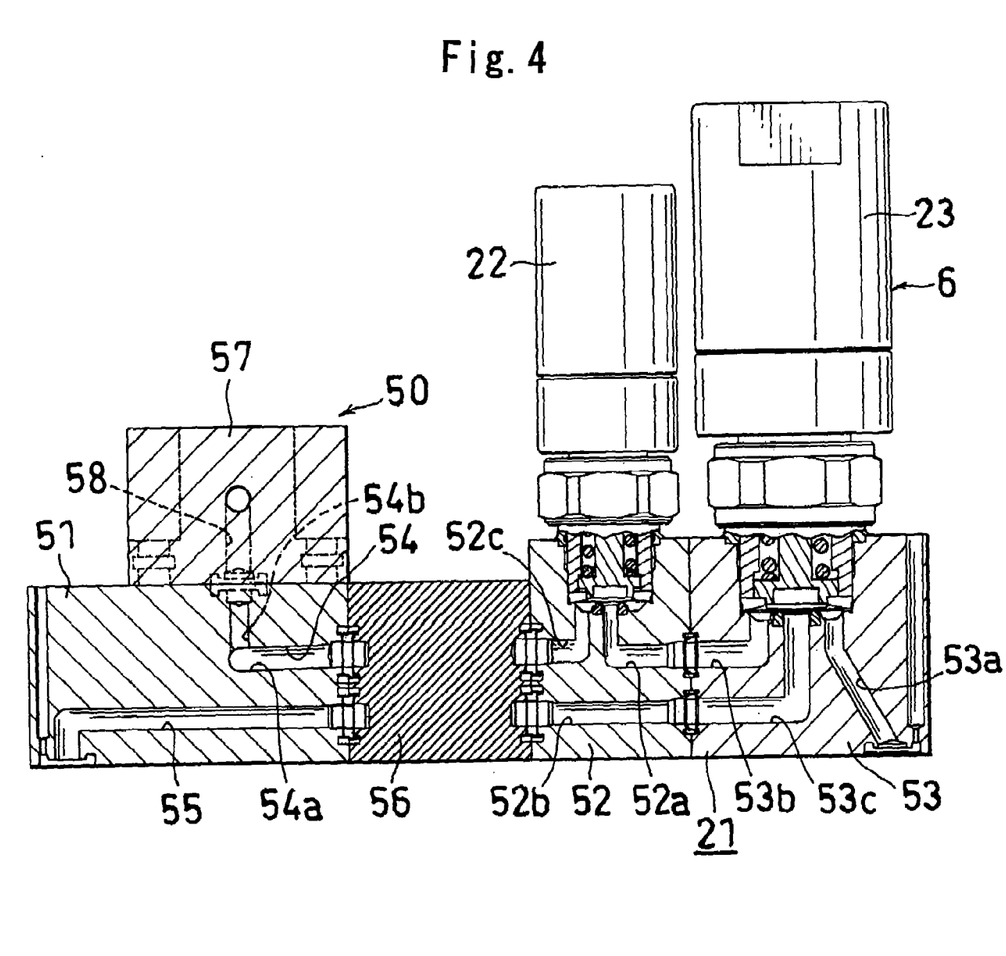
FIG. 4 is a view in section taken along the line IV—IV in FIG. 3.
Figure 5:
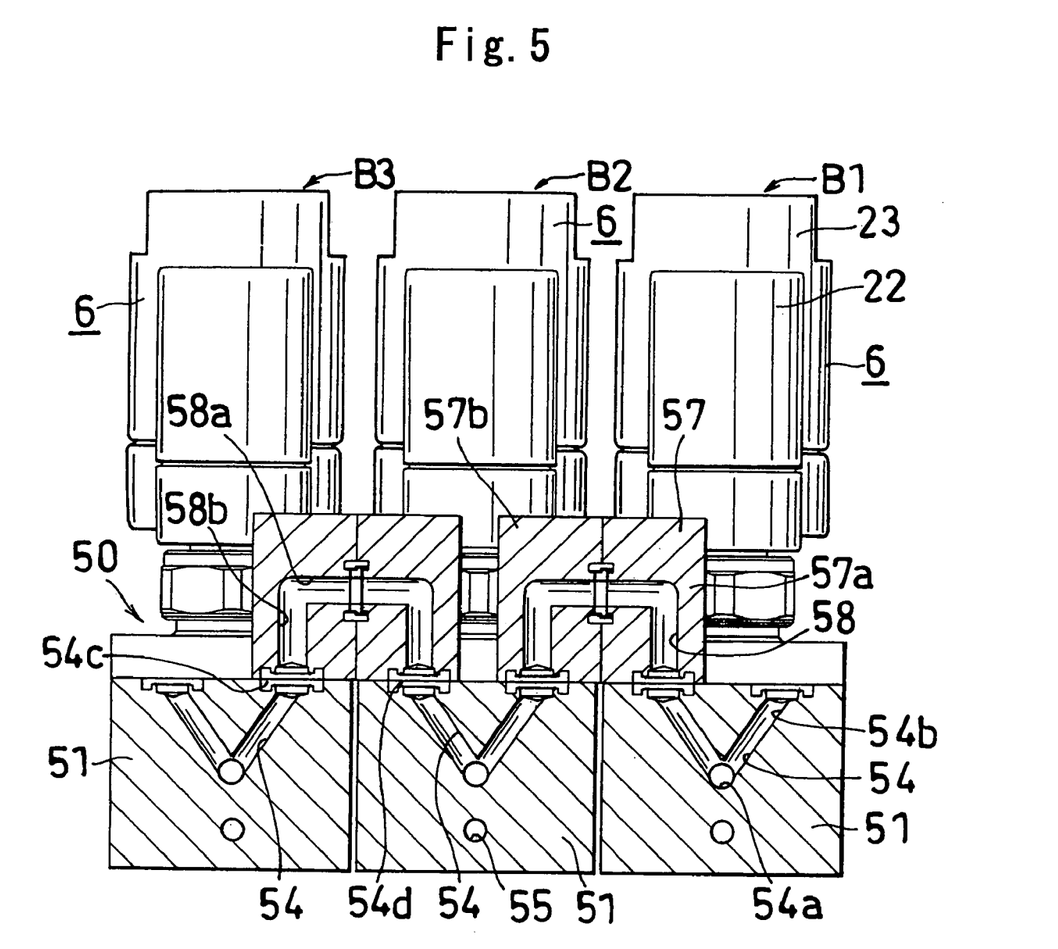
FIG. 5 is a view in section taken along the line V—V in FIG. 3.

Preferred embodiment of line interconnecting means 50 to be used in the place of the line interconnecting means 47, 48 shown in FIG. 13 comprises a plurality of (i.e., three shown) lower channel blocks 51, and a plurality of (i.e., two in the illustration) upper channel blocks 57 arranged on the upper side of the lower channel blocks 51 as shown in FIGS. 3 to 5. The lower channel blocks 51 are arranged in the upper stage of the lines B1, B2, B3 to be interconnected at the same position with respect to the direction of the lines (front-rear direction). Each upper channel block 57 comprises two blocks 57a, 57b joined to each other and is internally provided with an inverted U-shaped channel 58 which is open downward. The inverted U-shaped channel 58 comprises a transverse channel 58a extending orthogonal to the lines and two parallel downward channels 58b extending downward respectively from the left and right ends of the transverse channel 58a. As shown in FIG. 5, the upper channel block 57 is positioned on adjacent two lower channel blocks 51, and the inverted U-shaped channel 58 causes the left upward opening 54d of the lower channel block 51 of the right line B1 or B2 to communicate with the right upward opening 54c of the lower channel block 51 of the left line.

With reference to FIG. 3, the lower channel block 51 is removably fastened to a coupling member (blocklike coupling member indicated, for example, at 11 or 12 in FIG. 13) with screws 37 from above. The upper channel block 57 is removably fastened to the adjacent two lower channel blocks 51 with screws 59 from above.

Figure 6:
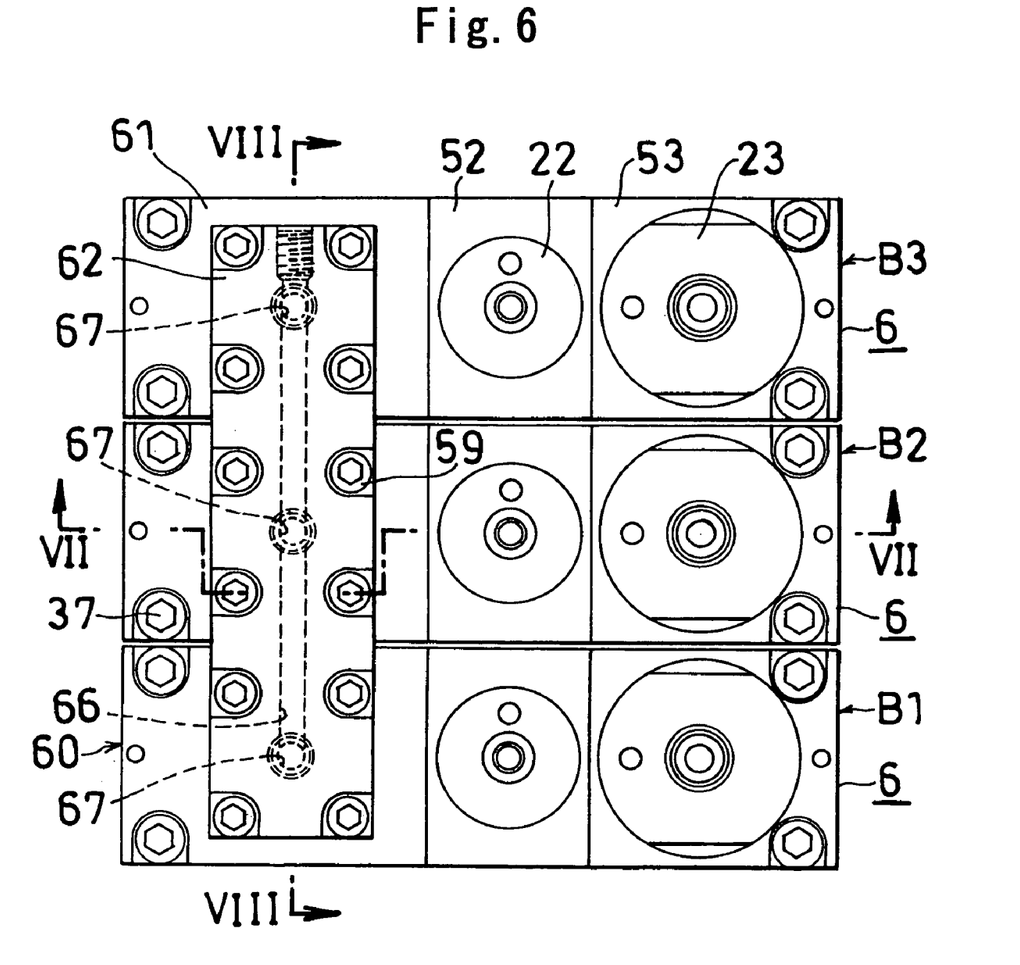
FIG. 6 is a fragmentary plan view showing a second embodiment of fluid control device of the invention.
Figure 7:
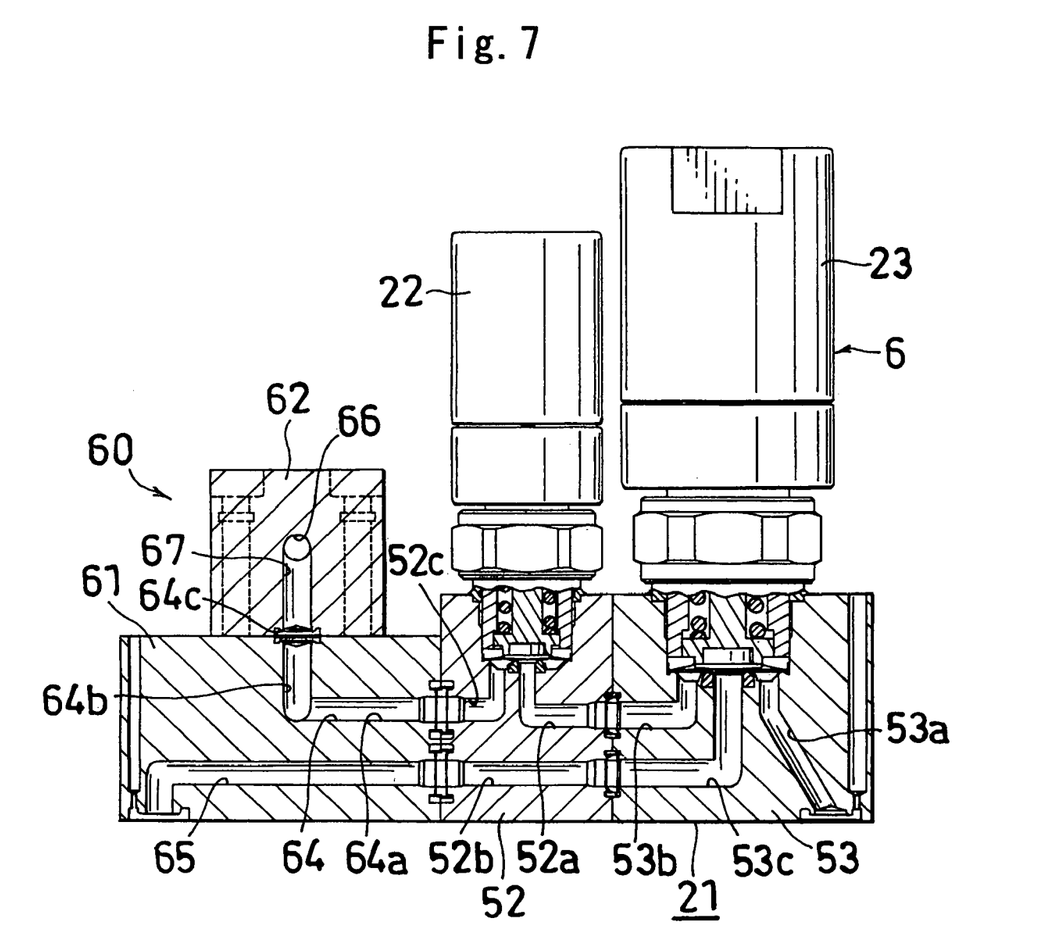
FIG. 7 is a view in section taken along the line VII—VII in FIG. 6.
Figure 8:
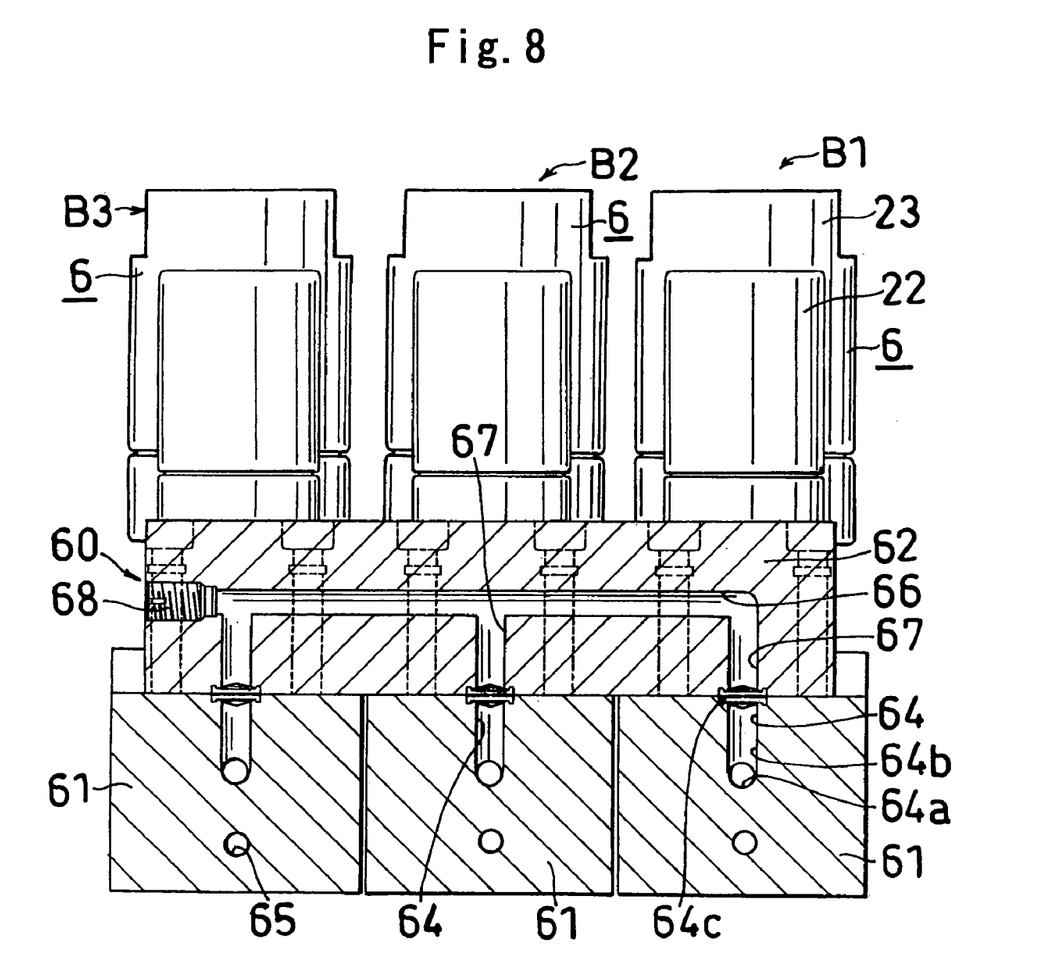
FIG. 8 is a view in section taken along the line VIII—VIII in FIG. 6.

FIGS. 6 to 8 show main portions of a second embodiment of fluid control device according to the invention. The second embodiment differs from the first embodiment with respect to the constructions of lower channel blocks 61 and an upper channel block 62 of line interconnecting means 60. Throughout the drawings concerned, like parts are designated by like reference numerals and will not be described repeatedly.

With the second embodiment, the means 60 for interconnecting the channels of specified lines B1, B2, B3 comprises a plurality of (i.e., three shown) lower channel blocks 61, and one upper channel block 62 disposed on the upper side of the lower channel blocks 61.

The lower channel block 61 is internally provided with a line interconnecting channel 64 communicating with an outlet channel 52c of 2-port valve block 52 of an inlet-side shutoff-opening device 6 and having an upward opening, and an in-line connecting channel 65 communicating with a bypass channel 52b of the block 52 of the device 6. The line interconnecting channel 64 comprises a line-direction channel 64a extending rearward from the opening of the outlet channel 52c of the shutoff-opening device 6, and an upward channel 64b extending upward from the rear end of the line-direction channel 64a and having an upward opening 64c. As shown in FIGS. 7 and 8, the upward channel 64b is I-shaped and extends upward.

The upper channel block 62, which is singly provided, has inside thereof a transverse channel 66 extending in the left-right direction, and downward channels 67 extending downward from the transverse channel 66 and communicating with the openings of upward channels 64b of line interconnecting channels 64 of the respective lower channel blocks 61. As shown in FIGS. 6 and 8, the upper channel block 62 is provided on and extends across all the lower channel blocks 61 of the three lines B1, B2, B4 and has its downward channels 67 aligned with the respective upward channels 64b of the lower channel blocks 61. The transverse channel 66 is closed at its left and right ends; a left-end opening formed in making the channel is closed with a closure member 68.

Each lower channel block 61 is removably fastened to a coupling member (blocklike coupling member indicated, for example, at 11 or 12 in FIG. 13) with screws 37 from above. The upper channel block 62 is removably fastened to the lower channel blocks 61 with screws 59 from above.

Figure 9:
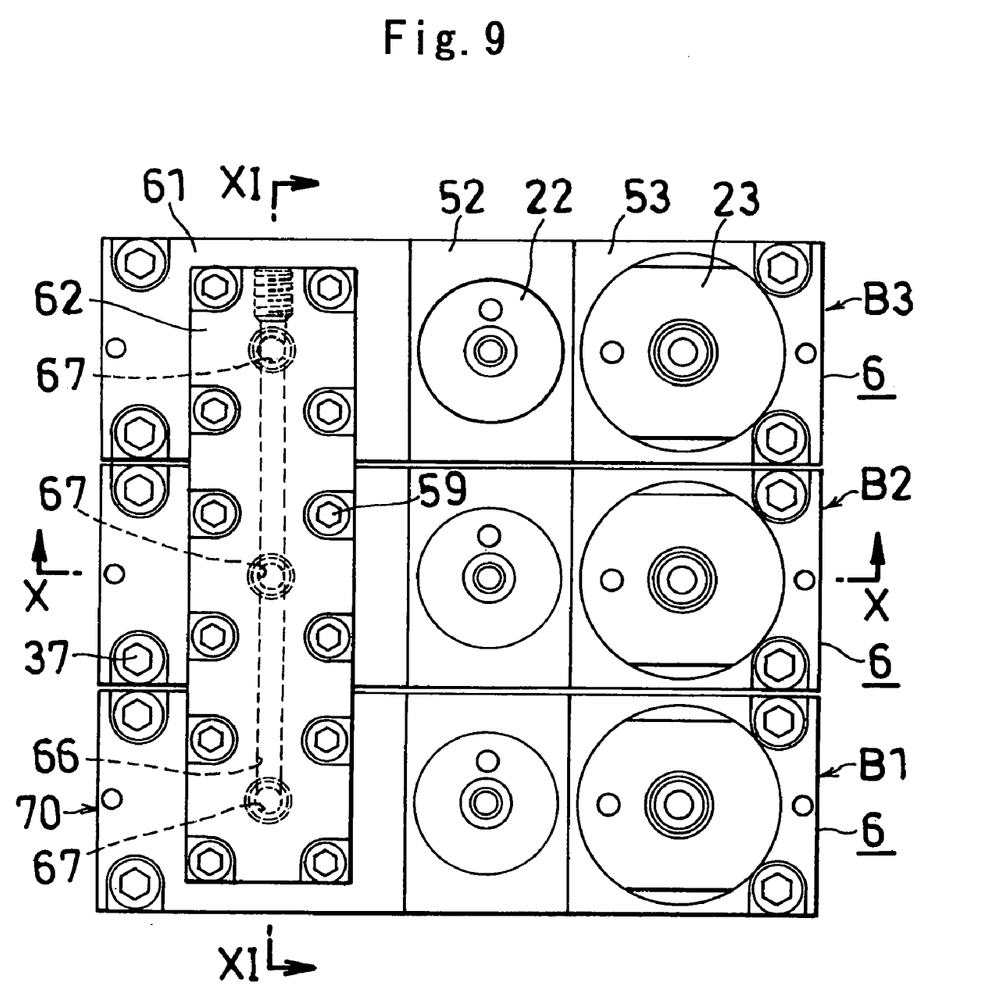
FIG. 9 is a fragmentary plan view showing a third embodiment of fluid control device of the invention.
Figure 10:
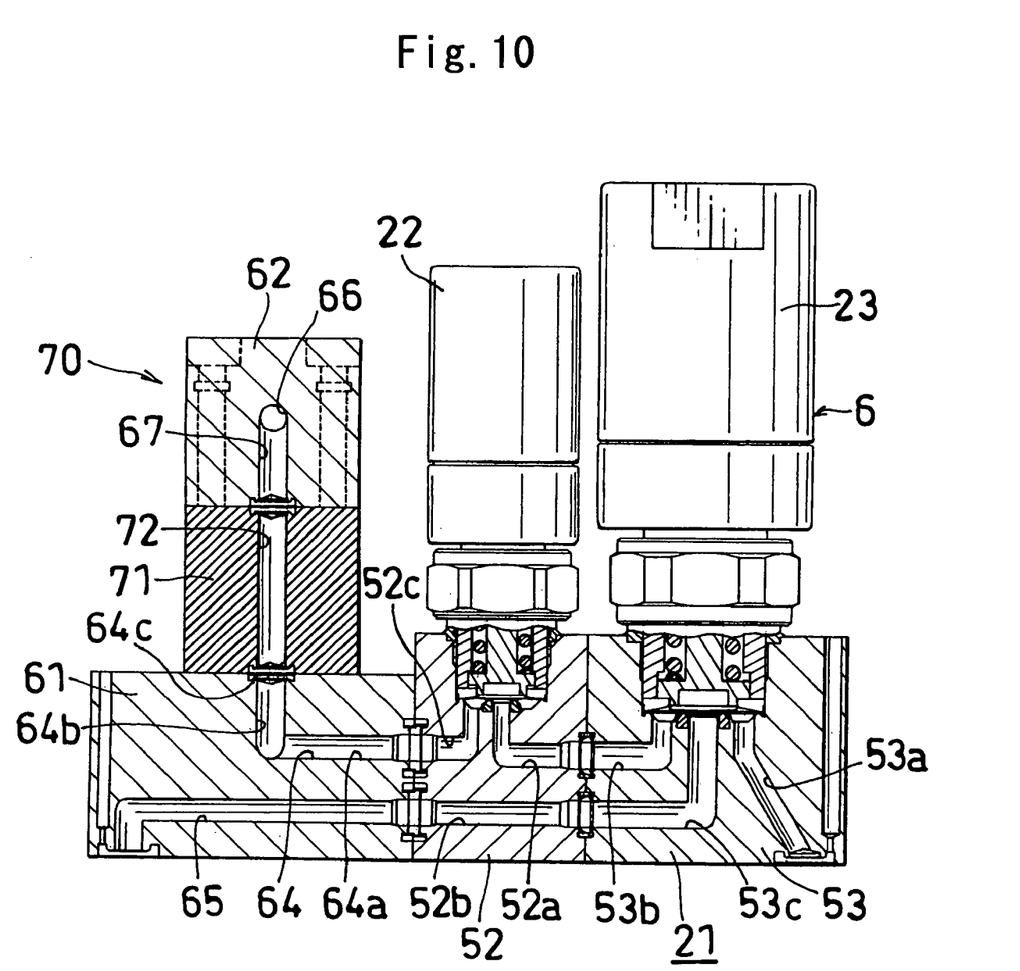
FIG. 10 is a view in section taken along the line X—X in FIG. 9.
Figure 11:
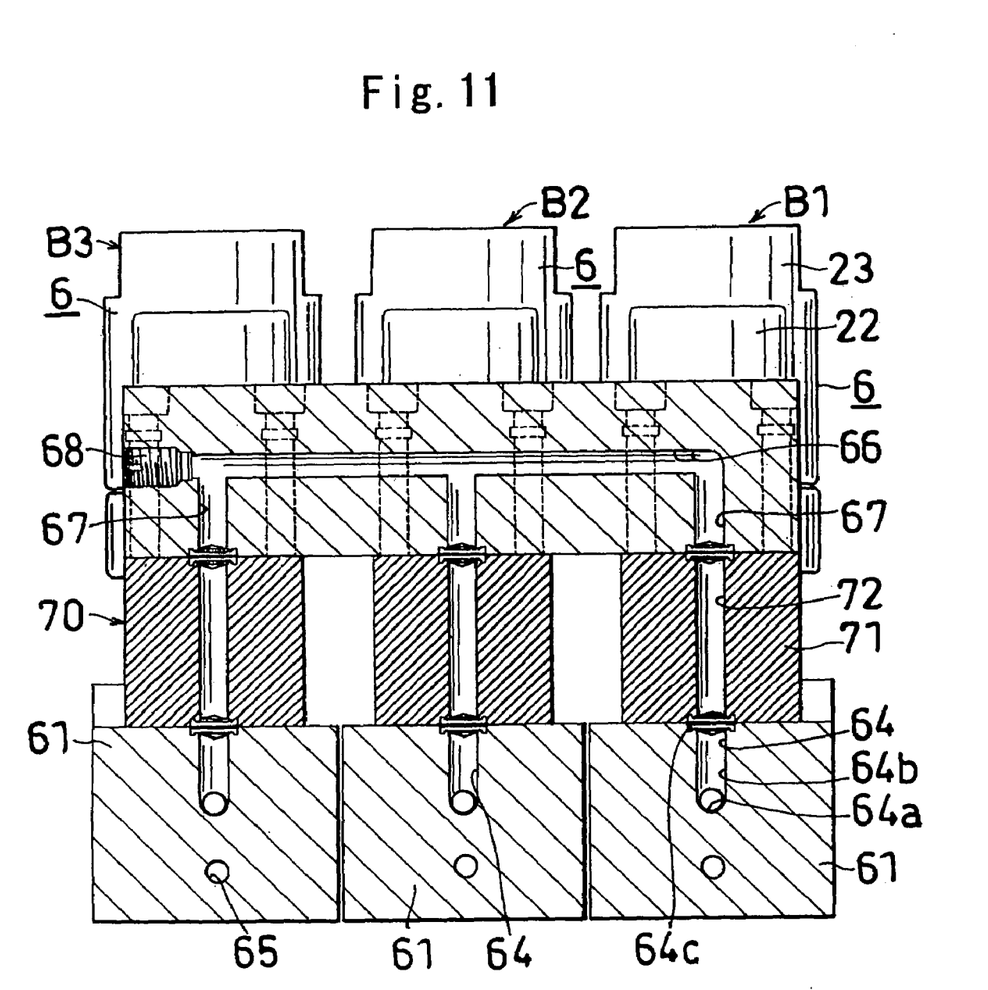
FIG. 11 is a view in section taken along the line XI—XI in FIG. 9.

FIGS. 9 to 11 show main portions of a third embodiment of fluid control device according to the invention. The third embodiment differs from the second embodiment in that another block 71 is provided between each lower channel block 61 of the line interconnecting means and the upper channel block 62 thereof. Throughout the drawings concerned, like parts are designated by like reference numerals and will not be described repeatedly.

According to the third embodiment, line interconnecting means 70 for interconnecting the channels of the specified lines B1, B2, B3 comprises a plurality of lower channel blocks 61, one upper channel block 62 disposed above the lower channel blocks 61 and a plurality of intermediate channel blocks 71 (the same as the lower blocks 61 in number) interposed between the blocks 61, 62.

The intermediate channel block 71 has an I-shaped channel 72 having an upward and a downward opening for causing the upward channel 64b of the corresponding lower channel block 61 to communicate with the corresponding downward channel 67 of the upper channel block 62. These upward channel 64b, the I-shaped channel 72 and the downward channel 67 are vertically arranged in alignment so as to ensure reduced flow resistance. While the channel portion holding the channel of the lower block 61 in communication with the channel of the upper block 62 remains in the same direction as in the second embodiment, the upper channel block 62 is positioned at a level higher than in the second embodiment by an amount corresponding to the height of the intermediate channel block 71, whereby the upper block 72 is positioned approximately at the same level as the shut-off valve actuators 22, 23. This renders the upper block 62 easier to remove from and mount on the lower block 61.

Figure 12:
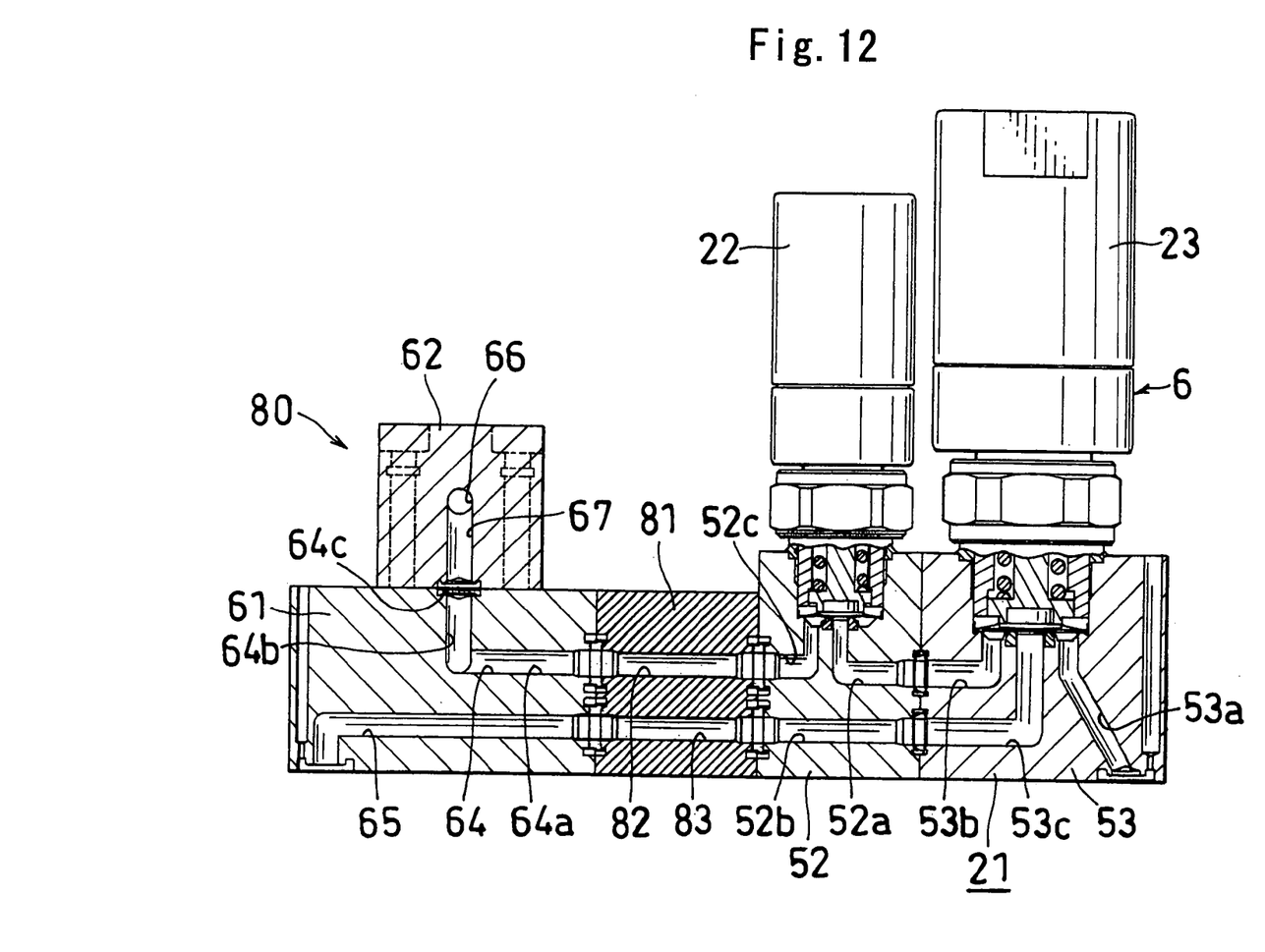
FIG. 12 is a fragmentary view in vertical section showing a fourth embodiment of fluid control device of the invention.

FIG. 12 shows a fourth embodiment of fluid control device according to the invention. The fourth embodiment differs from the second embodiment in that the line interconnecting means 80 has other blocks 81 adjacent to the lower channel blocks 61. Throughout the drawings concerned, like parts are designated by like reference numerals, and will not be described repeatedly.

The means 80 of this embodiment for interconnecting the channels of the specified lines B1, B2, B3 comprises a plurality of lower channel blocks 61, one upper channel block 62 disposed on the upper side of the lower channel block 61, and a plurality of intermediate channel blocks 81 (the same as the lower channel block 61 in number) interposed between the lower channel blocks 61 and the shutoff-opening devices 6.

Each intermediate channel block 81 has parallel upper and lower straight channels 82, 83 each having a forward and a rearward opening. The upper straight channel 82 holds the outlet channel 52c of the shutoff-opening device 6 in communication with the line-direction channel 64a of the lower channel block 61. The lower straight channel 83 causes the bypass channel 52b of the shutoff-opening device 6 to communicate with the in-line connecting channel 65 of the lower channel block 61. While the communication portion between the lower block 61 and the shutoff-opening device 6 remains in the same direction as in the second embodiment, this increases the distance between the upper channel block 62 and the shutoff-opening device 6. This shifts the position of the upper channel block 62 rearward as desired, further rendering the upper block 62 easier to remove from or mount on the lower block 61.

The invention claimed is:

1. A fluid control device comprising a plurality of lines arranged in parallel and having respective inlets, as well as respective outlets, facing toward the same direction, each of the lines comprising a plurality of fluid controllers arranged in an upper stage and a plurality of coupling members arranged in a lower stage, specified lines among said lines having fluid channels thereof interconnected by line interconnecting means, the fluid control device being characterized in that the line interconnecting means comprises lower channel blocks each having a line interconnecting channel and arranged in upper stage of the specified lines interconnected, at the same position with respect to the direction of the lines, the line interconnecting channel having at least one upward opening, and at least one upper channel block disposed on an upper side of the lower channel blocks of adjacent lines interconnected and having a transverse channel extending orthogonal to the lines and downward channels extending from the transverse channel and communicating with the upward openings of the respective line interconnecting channels of the lower channel blocks, each of the lower channel blocks being removably fastened to the coupling member in the lower stage with screws from above, the upper channel block being removably fastened to the lower channel blocks with screws from above.

* * * * *